Patented Aug. 17, 1937

2,090,211

UNITED STATES PATENT OFFICE 2,090,211

MERCAPTO ARYL THIAZOLE COMPOUND

Joy G. Lichty, Stow, Ohio, assignor to Wingfoot Corporation, Wilmington, Del., a corporation of Delaware No Drawing. Application February 7, 1935, Serial No. 5,402

5 Claims. (Cl. 260—44)

This invention relates to the vulcanization of rubber and in particular to the use of a new class of compounds as accelerators of vulcanization. The new compounds are mercapto aryl thiazole derivatives and may be called benzoyl methyl di(aryl thiazyl 1-sulphides) and are represented by the formula

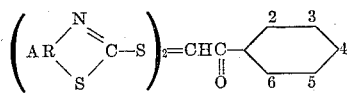

wherein AR is an ortho arylene radical and the positions 2, 3, 4, 5 and 6 are occupied completely or in part by hydrogen, NO$_2$, OH, OCH$_3$ and other alkoxy radicals, the halogens such as Cl, CH$_3$ and other alkyl radicals, etc.

Various mercapto aryl thiazole derivatives have been known heretofore and have been used as accelerators of vulcanization. Of these various derivatives some are too weak in accelerating activity to have any commercial value. Others are so powerful in their action that they may be used only with care in the processing of rubber in which they are contained. Others are disadvantageous because of poor physical properties for incorporation in rubber, because of the expense of their preparation, etc. For instance, it is shown in British Patent No. 361,917 that benzoyl methyl benzothiazyl 1-sulphide may be employed as an accelerator of vulcanization. It, however, has little or no accelerating action by itself and requires activation by a basic organic material, such as diphenylguanidine, to be of any value. Even when activated by a basic material this compound has poor accelerating power.

This invention comprises the discovery that the benzoyl methyl di(aryl thiazole 1-sulphides) are in and of themselves good accelerators of the vulcanization of rubber. While basic organic accelerators, such as diphenylguanidine, can be used to advantage with these accelerators, it will be understood that the use of such basic materials is not necessary.

In general, the compounds of this invention may be prepared by simply bringing together in a suitable medium a dihalogenated acetophenone and a salt of a mercapto aryl thiazole. It will, of course, be understood that in certain instances it is desirable to heat the mixture for a short period of time or, in the alternative, to allow it to stand for several hours. In general, the medium employed will be a solvent for the materials, of which water, benzene and alcohol are usually satisfactory. In some cases small amounts of di(arylthiazyl) disulphide form. In such cases it has been found that the use of an anhydrous solvent is helpful in inhibiting the formation of di(arylthiazyl) disulphides. While solutions of the reacting materials usually give the best yield of product, it will be understood that suspensions of the materials may be brought together with a resulting good yield of product. Thus, instead of the usual preferable procedure of employing a solution of, for example, either the sodium or ammonium salt of 1-mercaptobenzothiazole, a suspension of 1-mercaptobenzothiazole may be used.

Illustrating the preparation of these compounds is the preparation of benzoyl methyl di(benzothiazyl 1-sulphide). It was prepared by adding a solution of 56.7 grams of dichloro aceto phenone (0.3 mol.) in 400 cc. of acetone to a solution of 113.4 grams of the sodium salt of mercaptobenzothiazole (0.6 mol.) in 250 cc. of water. The mixture was stirred constantly for approximately 12 hours at room temperature. This period, however, was longer than necessary. Two liquid layers formed, the upper comprising water and acetone and the lower being of a viscous nature and containing the product benzoyl methyl di(benzothiazyl 1-sulphide). The layer of water and acetone was decanted and the viscous layer treated with 400 cc. of ether. Thereupon, except for 18 grams of solid dibenzothiazyl disulphide which apparently formed during the reaction, the viscous layer went into solution in the ether. The ether solution was then removed from the precipitated material by filtration, dried with calcium chloride and refiltered. After evaporating the ether, the product was dried in a vacuum desiccator over sulphuric acid, whereupon 109.2 grams of benzoyl methyl di(benzothiazyl 1-sulphide) in the form of a viscous oil were obtained. The equation representing the reaction is as follows:

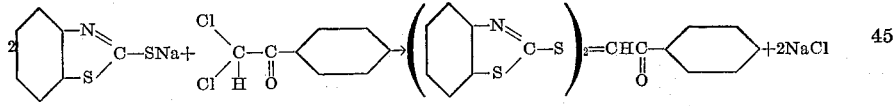

Other mercapto aryl thiazoles which may be reacted with a dihalogenated acetophenone in the practice of the invention are 1-mercapto naphtho thiazole, 1-mercapto alpha naphtho thiazole, 1-mercapto beta naphtho thiazole, 1-mercapto 4-nitro benzothiazole, 1-mercapto 5-nitro benzothiazole, 1-mercapto 4-chlor benzothiazole, 1-mercapto 5-chlor benzothiazole, 1-mercapto 3-phenyl benzothiazole, 1-mercapto 3-methyl benzothiazole, 1-mercapto 5-hydroxy benzothiazole, 1-mercapto 3-methoxy benzothiazole, 1-mercapto 5-ethoxy benzothiazole, 1-mercapto 5-amino benzothiazole, 1-mercapto 4-chlor 5-nitro benzothiazole, 1-mercapto xylyl thiazoles, and other halogen-, nitro-, hydroxy-, alkoxy-, and amino-substituted arylene mercaptothiazoles. It will also be understood that instead of dichlor acetophenone any other dihalogenated acetophenone, such as dibrom acetophenone, may be employed. Other compounds which fall within the scope of the invention are benzoyl methyl di (alpha naphthathiazyl 1-sulphide), benzoyl methyl di(beta naphthathiazyl 1-sulphide), benzoyl methyl di(5-nitro benzothiazyl 1-sulphide), benzoyl methyl di(3-phenyl benzothiazyl 1-sulphide), benzoyl methyl di(5-methoxy benzothiazyl 1-sulphide), benzoyl methyl di (4-chlor benzothiazyl 1-sulphide), benzoyl methyl di(6-methyl benzothiazyl 1-sulphide), and the like.

The compounds to which the invention relates may be employed as accelerators of vulcanization in substantially any of the standard rubber formulae, one found particularly satisfactory being the following:

| | Parts by weight |
|---|---|
| Extracted pale crepe rubber | 100.0 |
| Zinc oxide | 5.0 |
| Sulphur | 3.0 |
| Stearic acid | 1.5 |
| Accelerator | as indicated |

Results obtained by the use of this formula are summarized in the following table:

| Cure in mins. at °F. | Ult. tensile kgs/cm² | Max. elong. in percent | Modulus in kgs/cm² | |
|---|---|---|---|---|
| | | | 500% | 700% |
| *Benzoyl methyl di(benzothiazyl 1-sulphide), 0.5 part* | | | | |
| 20/285 | 82 | 953 | 11 | 23 |
| 30 | 98 | 875 | 15 | 27 |
| 40 | 116 | 860 | 17 | 46 |
| 60 | 114 | 830 | 19 | 50 |
| *Benzoyl methyl di(benzothiazyl 1-sulphide), 0.5 part; diphenylguanidine, 0.2 part* | | | | |
| 10/260 | 48 | 845 | 10 | 23 |
| 15 | 125 | 845 | 15 | 52 |
| 20 | 150 | 790 | 22 | 86 |
| 30 | 187 | 775 | 30 | 125 |
| 40 | 208 | 740 | 37 | 160 |

The novel compounds to which the invention relates thus possess valuable properties as accelerators of vulcanization. As disclosed in the preceding data, they may be employed either by themselves or in conjunction with activators of the nature of basic organic nitrogen-containing accelerators, of which examples are diphenylguanidine, diortho tolyl guanidine, diphenylguanidine acid oxalate, diortho tolyl guanidine neutral succinate, butyl ammonium oleate, cyclohexyl ammonium fumarate, dicyclohexyl ethylene diamine and the high boiling ethylene poly amines such as those boiling between the range of 160° C. at normal pressure and 270° C. at 25 mm. It will be noted that the compounds of the invention are fairly good accelerators when tested alone and that they are excellent when activated with a basic accelerator. Another advantage is that when activated the rubber stock containing them resists oxidation effectively.

It is intended that the patent shall cover, by suitable expression in the appended claims, whatever features of patentable novelty reside in the invention.

What I claim is:

1. Benzoyl methyl di(benzothiazyl 1-sulphide).
2. A benzoyl methyl di(benzothiazyl 1-sulphide).
3. A compound having the formula

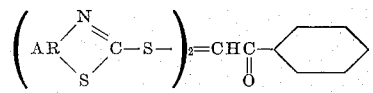

wherein AR represents an ortho arylene radical.

4. A compound having the formula

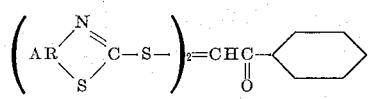

wherein AR is an ortho arylene radical of the benzene and naphthalene series.

5. A benzoyl methyl di(arylene thiazyl 1-sulphide).

JOY G. LICHTY.